United States Patent
Tanzmann et al.

(10) Patent No.: US 6,221,185 B1
(45) Date of Patent: Apr. 24, 2001

(54) METHOD FOR MANUFACTURING COMPONENTS BY CRITICAL FORMATION OF LIGHT METAL STRIP

(75) Inventors: Wolfgang Tanzmann, Solingen; Helmut Tümmler, Hilden; Ralf Duning, Solingen; Uwe Gohrbandt, Haan; Peter von Czarnowski, Kempen; Gerhardt Söllner, St. Augustin, all of (DE)

(73) Assignee: Michelin Kronprinz Werke GmbH, Solingen (DE)

( * ) Notice: Subject to any disclaimer, the term of this patent is extended or adjusted under 35 U.S.C. 154(b) by 0 days.

(21) Appl. No.: 09/254,065

(22) PCT Filed: Aug. 26, 1996

(86) PCT No.: PCT/DE96/01602

§ 371 Date: Feb. 26, 1999

§ 102(e) Date: Feb. 26, 1999

(87) PCT Pub. No.: WO98/08996

PCT Pub. Date: Mar. 5, 1998

(51) Int. Cl.[7] ................ C22F 1/047; C22F 1/00
(52) U.S. Cl. ............ 148/569; 148/570; 148/639; 148/643; 148/695
(58) Field of Search ................ 148/569, 570, 148/639, 643, 691, 692, 693, 695

(56) References Cited

U.S. PATENT DOCUMENTS 4,405,386 * 9/1983 Mravic et al. .
4,959,107 * 9/1990 Wallick et al. .

FOREIGN PATENT DOCUMENTS

| 3247698A | * | 7/1984 | (DE) . |
| 3318861 | * | 11/1984 | (DE) . |
| 3405478A | * | 8/1985 | (DE) . |
| 3903726A | * | 8/1990 | (DE) . |
| 4313543 | * | 4/1994 | (DE) . |
| 196 19 034 U | * | 1/1997 | (DE) . |
| 699775A | * | 3/1996 | (EP) . |

OTHER PUBLICATIONS

Japan Patent Abstract, vol. 009, No. 268 (M–424) JP 60 11 4412–A (Nitsushin Seikou KK), Jun. 20, 1985, Oct. 25, 1985.*

* cited by examiner

Primary Examiner—Deborah Yee
(74) Attorney, Agent, or Firm—Cohen, Pontani, Lieberman & Pavane

(57) ABSTRACT

The invention relates to a method for manufacturing components from critical cold forming of light metal strip, preferably naturally hard Al alloys of the AlMg or AlMg—Mn types, in which the desired component is manufactured from the strip by at least one cold forming step and the plasticity is improved before the cold forming by means of a soft annealing. According to the invention, it is proposed that the region of the longitudinal edges of the cold-slit strips is heated in a depth in the strip width of at least 1 mm to a maximum of 10 mm in such a way that a temperature of over 150° C. is reached over a time span of more than 0.1 seconds to a maximum of 10 seconds.

13 Claims, No Drawings

METHOD FOR MANUFACTURING COMPONENTS BY CRITICAL FORMATION OF LIGHT METAL STRIP

This application is a 371 of PCT/DE96/01602 Aug. 26, 1996.

BACKGROUND OF THE INVENTION

1. Field of the Invention

The invention relates to a method for manufacturing components from light metal strip.

2. Description of the Prior Art

In a light metal strips of naturally hard Al alloys, in particular of the AlMg or AlMg—Mn types, problems occur during cold forming at the cut edges from slitting, attributable not only to the microcracks caused by the slitting but also in particular to the cold hardening brought about as a result. To ensure greatest possible plasticity, the entire sheet bars are soft-annealed in the stack or the entire coil is soft-annealed in a so-called bell-type furnace. During drawing off of the strip from the soft-annealed coil, the coil curvature is straightened until flat. This straightening produces a certain additional cold hardening, which leads to a further increase in the yield strength and reduction in stress. What is disadvantageous in the known methods is the amount of energy and time expended for the soft-annealing of the entire material.

DE 3247698 C2 discloses an intermediate annealing of strip of an AlMgMn alloy. This intermediate annealing, which takes place between two successive cold rolling passes, is carried out as coil annealing at a temperature of 300 to 410° C. during a period of ½ to 8 hours. Alternatively, the annealing may also take place at 300 to 400° C. as continuous strip annealing for a period of 2 seconds to 2 minutes. Both annealing methods expend considerable amounts of energy (time, temperature) and the handling effort is also considerable. The last-mentioned annealing method for continuous strip annealing also requires enormous expenditure on equipment.

DE 4313543 C1 discloses a method for the heat treatment of continuous light-metal strips. For thin-walled strips with a thickness of 0.02 to 1.5 mm in particular, problems occur in the edge region in cases of high through-running speeds and/or great strip widths. The edge regions often become wavy, which may disrupt later processing. This edge region effect can be avoided if more heat is supplied per unit area to the edge regions of the strip than to the central region of the strip, at least over part of the treatment zone. This type of annealing corresponds in principle to continuous strip annealing with a steeper temperature gradient in the edge region to avoid wave formation. The already known disadvantages of continuous strip annealing likewise apply here.

SUMMARY OF THE INVENTION

The object of the invention is to specify a method for manufacturing components from critical formation light metal strip which is less costly than the known method with regard to energy consumption, cycle time and expenditure on equipment.

This object is achieved according to the invention by briefly heating only the region of the longitudinal edges of the cold-slit hot-rolled strip in such a way that a temperature-time range customary for soft annealing is passed through. This is the case if the heat in the longitudinal edge region penetrates to a depth in the strip width of at least 1 mm to a maximum of 10 mm and the supply of heat is adjusted in such a way that a temperature of over 150° C. is reached over a time span of more than 0.1 seconds to a maximum of 10 seconds. Investigations in this connection have shown that the cut edges of the slit strip are to be regarded as critical for the subsequent cold forming operations. It has been established that microcracks form in this region during slitting and can lead to inadmissible incipient cracks during cold forming. It is already known to mill off these cut edges in order to eliminate the critical region in this way. This prior art method of milling is very time-consuming and removal of the chips gives rise to considerable problems. Furthermore, it is uneconomical, since the slit strips have to be cut wider, according to the machining depth, in order to achieve the desired normal size.

The required heat input for the soft annealing of the regions of the longitudinal edges may take place by means of radiation, convection or conduction, as options or in combination. Inductive heating has been found to be particularly favorable, since in these methods considerable amounts of heat can be introduced in a relatively short time, so that this operation does not become the cycle-determining working step. Alternatively, it is also possible to introduce the heat by means of lasers or conventional gas burners.

DETAILED DESCRIPTION OF THE PREFERRED EMBODIMENTS

Depending on the application, the inventive annealing operation may be carried out on the strip after slitting or before coiling up or after coiling up and before straightening or after straightening and before cross-cutting, or on the individual cross-cut strips or in the stacking magazine. For the special case of wheel-rim manufacture, a heat treatment on the tire before or even during cold profiling is also possible.

The method can be used for all critical cold forming operations, in particular in the manufacture of longitudinally seam-welded pipes annealed to a certain state as well as in the manufacture of automotive wheel rims from light metal strip in a thickness range of 2–6 mm.

In the manufacture of longitudinally seam-welded pipes, the edge regions are expediently soft-annealed in the spheroidizing zone and before welding. In wheel-rim production, the inventive process is as follows:

In the rolling mill, slabs are rolled out to certain thickness to form multiple-width mother coils. These are cold-slit to the nominal width in a subsequent operation and coiled up again, giving rise to the aforementioned microcracks and strip-edge hardening or cold hardening effects.

During processing into wheel rims, the strip is unwound, straightened and cross-cut to a certain length. At the same time, a mechanical treatment of the longitudinal edges, for example rounding, may be integrated into the sequence. The individual strips are buffer-stored in stacking magazines, then bent or rounded in a machine. Before transfer into the welding machine, the ends may be pressed flat. After butt-welding, the seam is machined and, if required, the tire is rounded again.

The tire manufactured in this way is subsequently profiled by known methods to form a wheel rim.

In this production process, the inventive heat treatment is preferably performed on the individual strips after cross-cutting.

What is claimed is:

1. A method for manufacturing components via critical formation of a light metal strip, comprising the steps of:

forming the strip by rolling slabs out to form multiple width coils, cold-slitting the coils to a particular width, and coiling the slit strip;

cutting the strip by uncoiling the slit strip, straightening the slit strip, and cross-cutting to individual strips of certain lengths;

annealing the strip for improving the plasticity of the strip by heating only the region of the longitudinal edges of the strip to a depth of the strip width within the range including 1 mm to 10 mm such that a temperature-time range for soft-annealing is passed through, the temperature being greater than 150 degrees C. for a time period within the range including 0.1 to 10 seconds; and forming the component from the strip including a substep of performing a critical cold forming of the strip.

2. The method of claim 1, wherein said step of heating includes heating by at least one of radiation, convection, and conduction.

3. The method of claim 1, wherein said step of annealing is performed during a cycle in the production plant for producing the component.

4. The method of claim 1, wherein said step of annealing is performed after cold-slitting the slit strip and before coiling the slit strip.

5. The method of claim 1, wherein said step of annealing is performed after uncoiling the strip and before straightening the strip.

6. The method of claim 1, wherein said step of annealing is performed after straightening and before cross-cutting said strip for eliminating the cold-hardening caused by said straightening.

7. The method of claim 1, wherein said step of annealing is performed on the individual strips after said step of cross-cutting.

8. The method of claim 7, wherein said step of annealing is performed in a stacking magazine.

9. The method of claim 1, wherein said method comprises a method of forming a tire and said step of annealing is performed on the tire before said step of cold forming.

10. The method of claim 1, wherein said step of annealing is performed during said step of forming the component before said substep of performing a critical cold forming.

11. The method of claim 1, wherein said step of heating is performed using induction.

12. The method of claim 1, wherein said method comprises a method for manufacturing a light-metal longitudinally seam-welded pipe and said step of annealing is performed in a spheroidizing zone of the pipe before the pipe is welded.

13. The method of claim 1, wherein said method comprises a method for manufacturing automotive wheel rims, said step of forming the strip comprises forming a strip having a thickness within the range including 2–6 mm, and said step of heating being performed before said substep of performing a critical cold forming.

* * * * *